Feb. 7, 1933.  G. SPARANO  1,896,980
RUMBLE SEAT TOP
Filed Feb. 19, 1932  3 Sheets-Sheet 1

Gennaro Sparano
INVENTOR
BY Victor J. Evans & Co.
ATTORNEY

Feb. 7, 1933. G. SPARANO 1,896,980
RUMBLE SEAT TOP
Filed Feb. 19, 1932   3 Sheets-Sheet 2
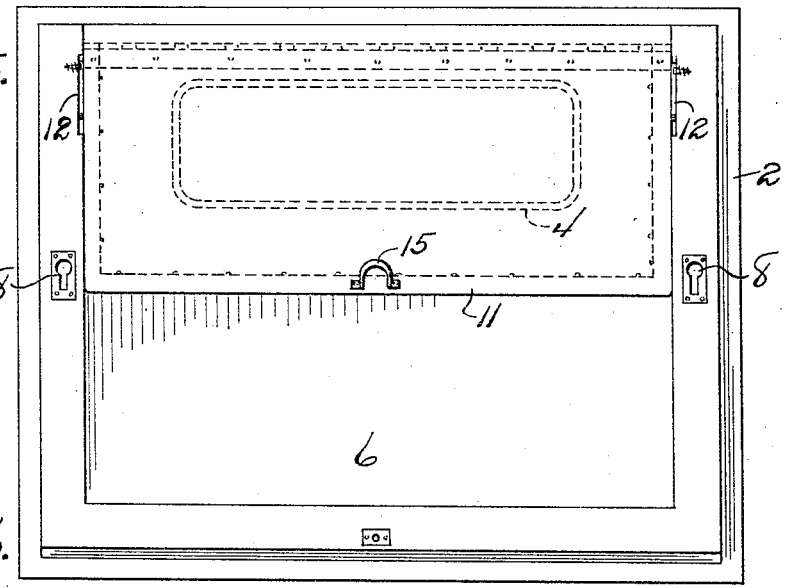
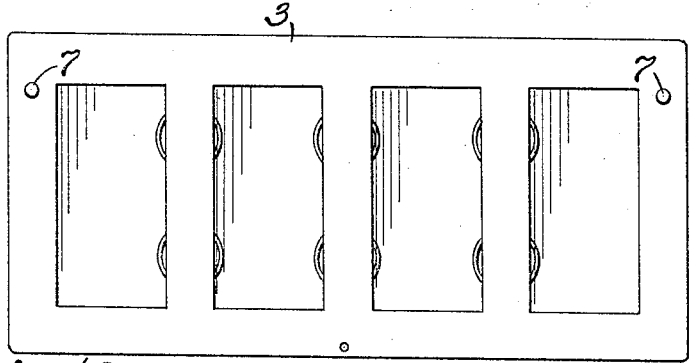
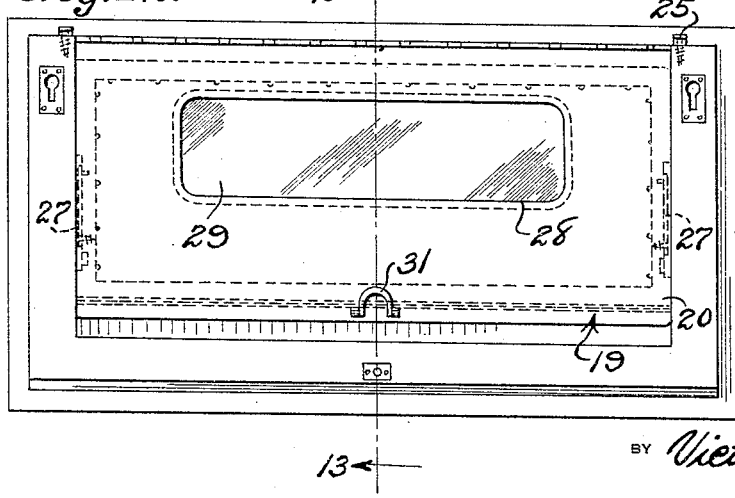
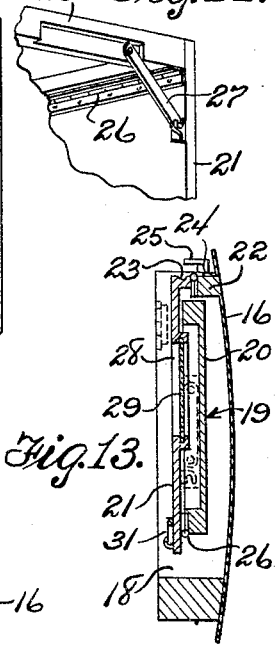
Gennaro Sparano
INVENTOR
BY Victor J. Evans & Co.
ATTORNEY Feb. 7, 1933.  G. SPARANO  1,896,980
RUMBLE SEAT TOP
Filed Feb. 19, 1932  3 Sheets-Sheet 3

Gennaro Sparano
INVENTOR

BY Victor J. Evans & Co.
ATTORNEY

Patented Feb. 7, 1933

1,896,980

UNITED STATES PATENT OFFICE

GENNARO SPARANO, OF PHILADELPHIA, PENNSYLVANIA

RUMBLE SEAT TOP

Application filed February 19, 1932. Serial No. 594,039.

This invention relates to rumble seat tops for automobiles and has for the primary object, the provision of a device of the above stated character which will afford the occupants of a rumble seat desirable protection against weather elements and also may be conveniently arranged to act as a shade against sun rays, permitting the occupants to obtain full ventilation and unobstructed vision.

Another object of this invention is the provision of a top which while in use will provide sufficient head room for the occupants of the rumble seat and is capable of folding for storage within the back of the rumble seat, whereby the top will be protected and may be readily obtained for use when desired.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary side elevation illustrating an automobile with a top applied to the rumble seat thereof and constructed in accordance with my invention.

Figure 5 is a front elevation illustrating the top in a folded position and with the cushioned back of the rumble seat removed from the cover of the rumble seat compartment.

Figure 6 is a rear elevation illustrating the cushioned back.

Figure 12 is a front elevation illustrating the top in a folded position.

Figure 13 is a sectional view taken on the line 13—13 of Figure 12.

Figure 14 is a fragmentary perspective view illustrating a modified form of brace for supporting the top in an operative position.

Figure 1:
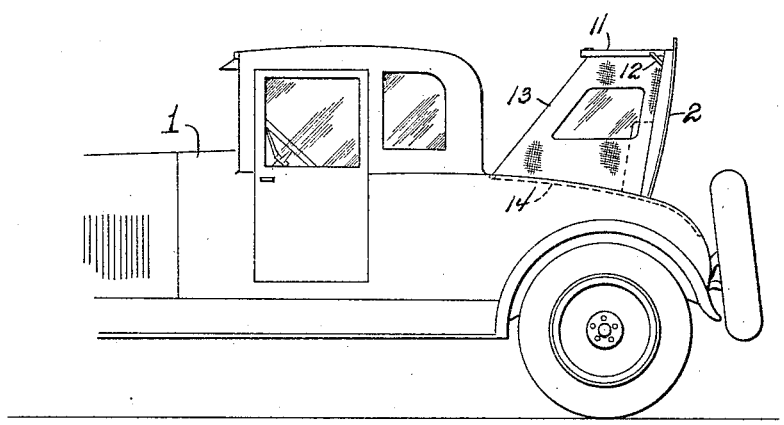
Figure 2:
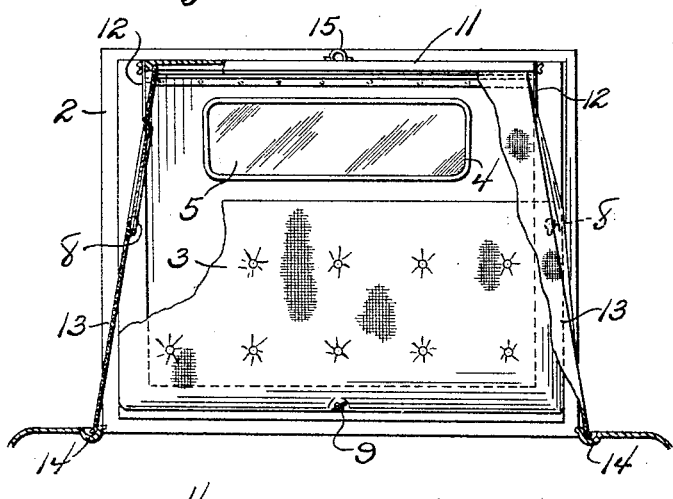
Figure 2 is a fragmentary transverse sectional view illustrating the side curtains associated with the top and connected to the body of the automobile.
Figure 3:
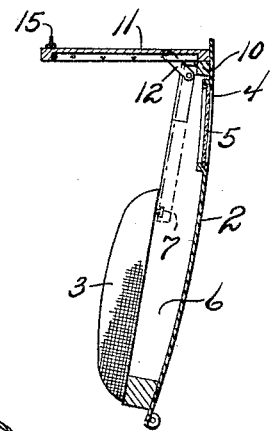
Figure 3 is a vertical sectional view illustrating the rumble seat top carried directly by the cover of the rumble seat compartment of the automobile body and illustrating in dotted lines the folding of the top within the back.
Figure 4:
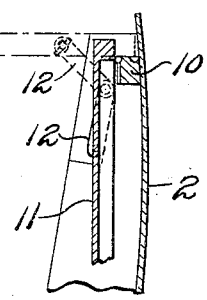
Figure 4 is an enlarged fragmentary sectional view showing the connection between the rumble seat top and the rumble seat cover of the automobile.
Figure 7:
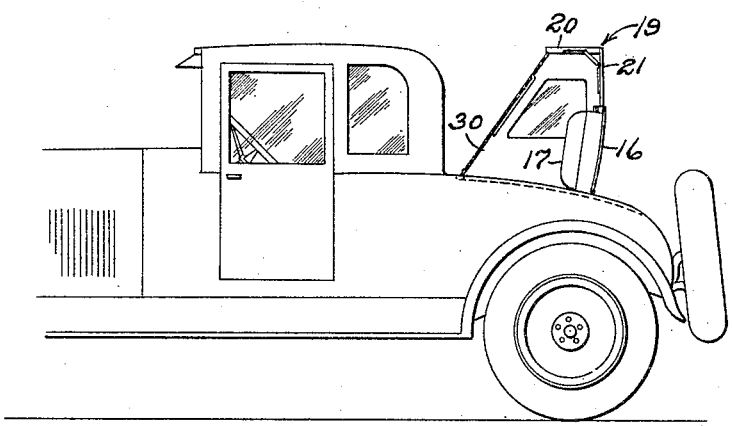
Figure 7 is a fragmentary side elevation illustrating an automobile with a modified form of rumble seat top applied thereto and shown partly in section.
Figure 8:
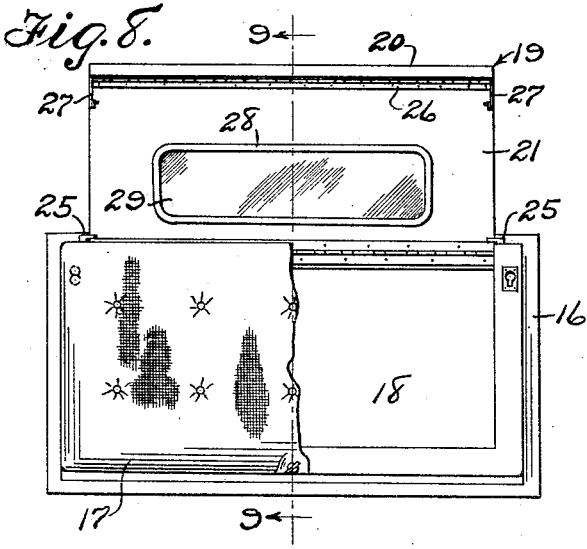
Figure 8 is a front elevation illustrating my modified form of top with the cushioned back broken away.

Referring in detail to the drawings, the numeral 1 indicates an automobile having formed in the rear of the body thereof a rumble seat compartment normally closed by a hinged cover 2 which when disposed vertically provides a support for the cushion back 3 of the rumble seat. The cover 2 extends a considerable distance above the upper edge of the cushion back 3 when disposed vertically and is provided with a rear vision opening 4 closed by a transparent panel 5. The cushion back 3 between itself and the cover 2 forms a storage compartment 6 and the cushion is removably secured to the cover 2 by headed fasteners 7 fitting within key hole slots of attaching plates 8 carried by the cover 2 whereby the back 3 may be removed for the purpose of giving access to the compartment 6. The lower edge of the cushion 3 is provided with an opening to permit a thumb bolt or fastener 9 to extend therethrough for cooperating with the headed fastener 7 in firmly securing the back in place on the cover.

A rail 10 is secured to the cover 2 adjacent its free edge and has hinged thereto a top 11 adapted to be supported in a horizontal position by collapsible braces 12 located between said top and the cover. It is to be understood that the top 11 is disposed horizontally when the cover 2 is positioned vertically so as to protect the occupants of the rumble seat from sun rays or rain.

Side and front curtains 13 are detachably secured to the top 11 and their lower edges are receivable within the drain groove 14 formed in the body of the automobile for the purpose of directing water drained from the curtains away from the rumble seat compartment of the automobile. The curtains at their lower edges are detachably secured within the grooves 14 by any type of fasteners which it may be desirable to employ.

By collapsing the braces 12 and removing the back 3 from the cover 2, the top 11 may be swung downwardly into the storage compartment 6 and with the back 3 again placed in position on the cover, the top will be retained in the storage compartment. The top 11 thus positioned permits the cover to be swung horizontally or in a position for closing the rumble seat compartment of the automobile or will permit the rumble seat to be used without a top. The top 11 is provided with a pivoted handle 15 for the purpose of permitting a person to easily obtain a grip on the top for moving the latter into operative or inoperative positions. If desired a window closed by a transparent panel may be formed in the top 11 and adapted to align with the sight opening 4 when the top 11 is placed within the storage compartment 6 so that rear vision may still be obtained through the panel 5 of the cover.

The side and front curtains are provided with sight openings closed by transparent panels permitting the occupants of the rumble seat to have vision with the curtains up or applied.

Figure 9:
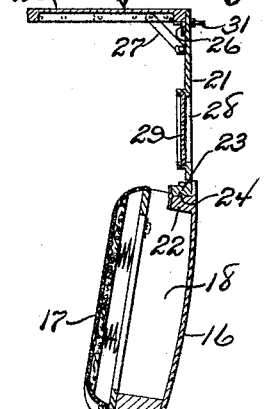
Figure 9 is a sectional view taken on the line 9—9 of Figure 8.
Figure 11:
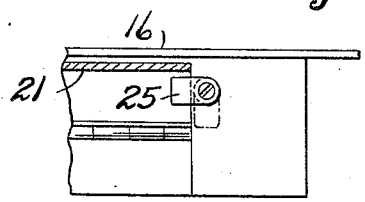
Figure 11 is a detail sectional view taken on the line 11—11 of Figure 10.
Figure 10:
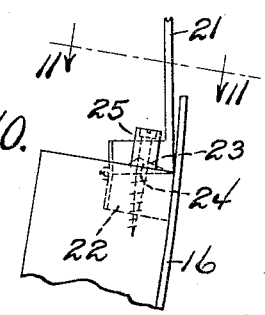
Figure 10 is an enlarged fragmentary detail view showing the connection between the top and the rumble seat compartment cover.

Referring to my modified form of invention as shown in Figures 7 to 13 inclusive, the cover 16 of the rumble seat compartment of the automobile is smaller than that shown in Figure 1 and is of the type customarily employed in automobile constructions now in use and a cushion 17 forms between itself and the cover 16 a storage compartment 18. The cushion 17 is removable from the cover 16 in a manner similar to the cushion 3. The top 19 of my modified form of invention consists of an upper portion 20 and a rear portion 21. The rear portion 21 is hinged to the sill 22 of the cover 16 and is provided with a groove 23 receiving a bead 24 on the rail for the purpose of establishing a leak-proof connection between the rear portion and the rail when the top is in use. Suitable pivoted fasteners 25 are carried by the cover 16 and are adapted to overlie the flanged lower edge of the rear portion 21 of the top 19 for the purpose of retaining the same in an operative or vertical position as shown in Figure 9. The upper portion 20 is hinged to the rear portion 21 as shown at 26 and is supported in a horizontal position by detachable braces 27. The rear portion 21 is provided with a sight opening 28 closed by a transparent panel 29 whereby rear vision may be obtained through the rear portion 21.

Side and front curtains 30 are detachably secured to the upper and rear portions of the top 19 and to the body of the automobile and are constructed similar to the curtains 13 and also detachably secured in the drain groove of the body of the automobile.

The upper portion of the top 19 is foldable into engagement with the rear portion 21 and the latter is foldable into the compartment 18 when the cushion 17 has been removed. With the top 19 stored within the compartment 18 and the cushion again applied to the cover 16, the rumble seat may be used without the top, however, should the weather become of such a nature wherein the occupants of the rumble seat desire protection, the top 19 may be readily moved out of the compartment 18 into an operative position whereby the occupants will be efficiently protected. The rear portion 21 of the top is provided with a pivoted handle 31 so that a person may readily swing the top into and out of the compartment 18 as desired.

While I have shown and described the preferred embodiment of my invention, it will be understood that minor changes in construction, combination and arrangement of parts may be made without departing from the spirit and scope of my invention, as claimed.

Having thus described my invention, what I claim is:

A rumble seat cover comprising a cover element movable into positions for opening and closing a rumble seat compartment, and adapted to extend vertically when occupying an open position, a strip secured to the cover element adjacent the free end thereof, a cushion removably secured to said cover element and cooperating with the latter in providing a top chamber, a top including hinged sections with one of said sections hinged to the strip and resting on the latter when disposed vertically, braces between said sections to permit folding of the latter on each other and within the top chamber, one of said sections having a rear vision opening, a transparent panel closing said opening, and means on said strip and engageable with one of the sections to retain the top in an operative position for protecting the rumble seat compartment.

In testimony whereof I affix my signature.

GENNARO SPARANO.